United States Patent
Li et al.

(10) Patent No.: US 11,697,595 B2
(45) Date of Patent: Jul. 11, 2023

(54) IRON-CARBON COMPOSITE MATERIAL, PREPARATION METHOD THEREOF AND USE THEREFOR

(71) Applicant: Institute of Eco-environmental and Soil Sciences, Guangdong Academy of Sciences, Guangzhou (CN)

(72) Inventors: Fangbai Li, Guangzhou (CN); Liping Fang, Guangzhou (CN); Kai Liu, Guangzhou (CN)

(73) Assignee: Institute of Eco-environmental and Soil Sciences, Guangdong Academy of Sciences

( * ) Notice: Subject to any disclaimer, the term of this patent is extended or adjusted under 35 U.S.C. 154(b) by 109 days.

(21) Appl. No.: 17/336,870

(22) Filed: Jun. 2, 2021

(65) Prior Publication Data

US 2022/0298018 A1  Sep. 22, 2022

(30) Foreign Application Priority Data

Mar. 22, 2021 (CN) .......................... 202110301245.8

(51) Int. Cl.
| | | |
|---|---|---|
| *C01B 32/914* | (2017.01) | |
| *B09C 1/08* | (2006.01) | |
| *C02F 1/28* | (2023.01) | |
| *C02F 1/68* | (2023.01) | |
| *C02F 1/72* | (2023.01) | |
| *C02F 101/20* | (2006.01) | |

(52) U.S. Cl.
CPC .............. *C01B 32/914* (2017.08); *B09C 1/08* (2013.01); *C02F 1/281* (2013.01); *C02F 1/68* (2013.01); *C02F 1/72* (2013.01); *C01P 2004/61* (2013.01); *C02F 2101/20* (2013.01)

(58) Field of Classification Search
None
See application file for complete search history.

(56) References Cited

U.S. PATENT DOCUMENTS

2017/0282229 A1  10/2017  Li et al.

FOREIGN PATENT DOCUMENTS

| CN | 104388094 A | 3/2015 |
|---|---|---|
| CN | 109225221 A | 1/2019 |
| CN | 112456488 A | 3/2021 |

OTHER PUBLICATIONS

Zhao et al., "Singlet oxygen mediated the selective removal of oxytetracycline in C/Fe3C/Fe0 system as compared to chloramphenicol", Environmental International, 2020, pp. 1-9, vol. 143, No. 105899.

*Primary Examiner* — Sheng H Davis
(74) *Attorney, Agent, or Firm* — The Webb Law Firm

(57) ABSTRACT

An iron-carbon composite material and a preparation method thereof are disclosed. The iron-carbon composite material includes a three-layer core-shell structure, which successively includes a porous graphite carbon outer layer, an iron carbide intermediate layer and a nano zero-valent iron core from outside to inside. The present invention wraps nano zero-valent iron in porous graphite carbon and iron carbide, which can prevent the oxidation of nano zero-valent iron, while iron carbide effectively improves the ability to fix arsenic, realizing high efficiency and long-term use of nano zero-valent iron. Iron carbide may effectively adsorb and fix arsenic, and especially efficiently oxidize As(III) to relatively low-toxic As(V).

20 Claims, 5 Drawing Sheets

IRON-CARBON COMPOSITE MATERIAL, PREPARATION METHOD THEREOF AND USE THEREFOR

CROSS-REFERENCE TO RELATED APPLICATION

This application claims priority to Chinese Patent Application No. 202110301245.8 filed Mar. 22, 2021, the disclosure of which is hereby incorporated by reference in its entirety.

TECHNICAL FIELD

The invention relates to the technical field of environmental restoration, in particular to an iron-carbon composite material, a preparation method thereof and use therefor.

BACKGROUND

Arsenic (As) is a highly toxic carcinogenic metal. Mining, non-ferrous metal smelting and pesticide are the main sources of arsenic pollution. With the development of society, heavy metal pollution in environmental water and soil is becoming more and more serious. Studies have shown that consumption of rice is the main source of intaking inorganic arsenic, a class I carcinogen. It is estimated that rice accounts for about 60% of the total dietary intake of inorganic arsenic. Inorganic arsenic in water and soil mainly exists as As(III) and As(V), among which As(III) is more toxic and mobile, and is easier to be absorbed from the soil to the water body as well as being absorbed and accumulated in the rice, threatening environment and human health. Therefore, how to remediate arsenic in water and soil, especially trivalent arsenic pollution, has become an environmental problem that needs to be solved urgently.

At present, there are many methods for remediation of arsenic pollution in the soil, such as soil leaching, stabilization, and phytoremediation. Due to the unique affinity between iron and arsenic, the application of iron-based and other passivating materials can partially realize the fixation of arsenic in farmland soil, reduce its activity, and inhibit its migration into crops (rice), which attracts the attention of domestic and foreign scholars. Zero-valent iron materials, as an environmentally friendly passivation material, can react with oxygen to produce active oxygen species, achieve oxidation of trivalent arsenic, and strengthen the fixation of arsenic. Therefore, in recent years it attracts extensive attention in remediation of arsenic and other heavy metal pollution in groundwater and soil. However, zero-valent iron has problems such as difficult storage and use, poor long-term effectiveness, and high preparation costs, which limit its large-scale application in the remediation of heavy metals such as arsenic in farmland soil.

SUMMARY OF THE INVENTION

The present invention aims to solve at least one of the technical problems existing in the prior art. For this reason, the present invention proposes an iron-carbon composite material, which has the ability to efficiently remove heavy metals, and in particular, it can efficiently remove and oxidize As(III).

At the same time, the present invention also provides a preparation method and use of the iron-carbon composite material.

Specifically, the technical solutions of the present invention are as follows:

A first aspect of the present invention is to provide an iron-carbon composite material. The iron-carbon composite material has a three-layer core-shell structure, which includes a porous graphite carbon outer layer, an iron carbide intermediate layer, and a nano zero-valent iron core in sequence from outside to inside.

The iron-carbon composite material according to the first aspect of the present invention includes at least the following beneficial effects:

Nano zero-valent iron has the ability to adsorb and fix arsenic. Under aerobic conditions, the divalent iron generated during the corrosion process of nano zero-valent iron can activate oxygen to generate active oxygen, which oxidizes As(III) to As(V) and reduces the toxicity and mobility of arsenic in the soil, thereby reducing the absorption and transportation of arsenic by crops. However, the inventor found that the application process of nano zero-valent iron also has the following shortcomings: firstly, it is easy to oxidize and agglomerate in the air, resulting in greatly reduced reactivity, which is not advantageous for long-term storage and use; secondly, it is easily interference by soil particles and other impurities when added to the soil, leading to a significant decrease in the fixation efficiency of arsenic. Also, the nano zero-valent iron reacts quickly and is corroded in a short time, resulting in poor long-term effect on the oxidation and fixation of As(III). The present invention uses a method of direct biomass pretreatment combined with pyrolysis reduction to wrap nano zero-valent iron in porous graphite carbon and iron carbide. Compared with the method of chemical reduction in the related art by using an aqueous solution of a reducing agent such as sodium borohydride to disperse nano zero-valent iron on the surface of biochar, the present method can prevent the oxidation of nano zero-valent iron, while iron carbide effectively improves the ability to fix arsenic, which realizes the efficient and long-term utilization of nano zero-valent iron. Iron carbide has a strong adsorption capacity to heavy metals, especially high-efficiency oxidation of As(III) to relatively low-toxic As(V).

In some embodiments of the present invention, the particle size of the porous graphite carbon is 10-100 μm.

In some embodiments of the present invention, the particle size of the nano zero-valent iron is 30-80 nm.

In some embodiments of the present invention, the total content of the iron carbide and nano zero-valent iron in the iron-carbon composite material is 5%-55%, preferably 20%-51%, and more preferably 24%-25%.

A second aspect of the present invention is to provide a method for preparing the above-mentioned iron-carbon composite material, which includes the following steps:

(1) soaking a biomass in a mixed solution of base and sulfite to carry out a first hydrothermal reaction; mixing the product obtained from the first hydrothermal reaction with an $H_2O_2$ solution, and carrying out a second hydrothermal reaction to obtain activated biomass;

(2) immersing the activated biomass in an iron salt solution to obtain biomass adsorbed with iron ions;

(3) reducing the biomass adsorbed with iron ions to obtain the iron-carbon composite material. In the preparation method of the present invention, firstly, the biomass is activated with a mixed solution of base and sulfite followed by $H_2O_2$ solution. Then iron ions are fully adsorbed, after which the pyrolyzed biomass is in-situ thermally reduced to obtain iron-carbon composite material with porous graphite carbon and iron carbide wrapped nano zero-valent iron.

In some embodiments of the present invention, in step (1), the particle size of the biomass is less than 2 mm.

In some embodiments of the present invention, the biomass may be any one or more of roots, stems, and leaves of woody plants, or herbaceous plants, preferably wood biomass.

In some embodiments of the present invention, in the mixed solution of the base and sulfite, the base includes one or more of sodium hydroxide, potassium hydroxide, and ammonia; the sulfite includes one or more of $Na_2SO_3$, $NaHSO_3$, $K_2SO_3$, $KHSO_3$.

In some embodiments of the present invention, in the mixed solution of the base and sulfite, the concentration of the base is 1-3 M, preferably 2-2.5 M, and more preferably about 2.5 M.

In some embodiments of the present invention, in the mixed solution of base and sulfite, the concentration of sulfite is 0.05-1 M, preferably 0.1-0.5 M, and more preferably about 0.4 M.

In some embodiments of the present invention, the volume of the mixed solution of base and sulfite can be adjusted according to actual conditions, where the biomass is preferably completely immersed. As an example, a ratio of the biomass to the mixed solution can be 1 g: 30-50 mL, preferably 1 g: 40-50 mL, and more preferably about 1 g: 42 mL.

In some embodiments of the present invention, the temperature of the first hydrothermal reaction is 80-120° C., preferably 90-100° C., and more preferably about 100° C.

In some embodiments of the present invention, the time of the first hydrothermal reaction is 8-12 h.

In some embodiments of the present invention, after the first hydrothermal reaction is completed, a step of taking out the solid product and washing it is further included.

In some embodiments of the present invention, the concentration of the $H_2O_2$ solution is 0.5-3 M, preferably 2-2.5 M, and more preferably about 2.5 M.

In some embodiments of the present invention, the volume of the $H_2O_2$ solution can be adjusted according to actual conditions, where the biomass is preferably completely immersed. As an example, the ratio of the biomass to the $H_2O_2$ solution can be set to 1 g: 30-50 mL, preferably 1 g: 40-50 mL, and more preferably about 1 g: 42 mL.

In some embodiments of the present invention, the temperature of the second hydrothermal reaction is 80-120° C., preferably 90-100° C., and more preferably about 100° C.

In some embodiments of the present invention, the time of the second hydrothermal reaction is 6-10 h.

In some embodiments of the present invention, after the second hydrothermal reaction, it further includes a step of taking out the solid product, washing and drying it. The drying may be freeze drying.

In some embodiments of the present invention, in step (2), the concentration of the iron salt solution is 0.02-0.5 M, preferably 0.1-0.5 M, more preferably 0.2-0.3 M, and more preferably about 0.2 M.

In some embodiments of the present invention, the iron salt is a trivalent iron salt, including any one or more of iron nitrate and its hydrate, iron chloride and its hydrate, and iron sulfate and its hydrate, where iron nitrate or its hydrate are preferred.

In some embodiments of the present invention, in step (2), the time of the soaking is 8-15 h. The soaking process can be assisted by ultrasound and/or vibration to fully adsorb the iron ions on the fiber surface. The time of the ultrasound treatment is 0.5-1 h, preferably 1 h.

In some embodiments of the present invention, the volume of the iron salt solution can be adjusted according to actual conditions, where the biomass is preferably completely immersed. As an example, a ratio of the biomass to the iron salt solution may be 1 g: 30-50 mL, preferably 1 g: 40-50 mL, and more preferably about 1 g: 42 mL.

In some embodiments of the present invention, in step (3), the reduction is pyrolysis reduction, which is specifically heating the biomass adsorbed with iron ions in a protective atmosphere. In a protective atmosphere, CO or $H_2$ produced by the pyrolysis of raw materials are used to reduce ferric iron to zero-valent iron. Compared with the addition of chemical reducing agent $NaBH_4$ to synthesize zero-valent iron, this method can improve the material's ability to remove and oxidize heavy metals, and meantime it is simple, economical and environmentally friendly.

In some embodiments of the present invention, the heating temperature is ≥800° C., preferably 800-1000° C., and more preferably about 800° C.

In some embodiments of the present invention, in the heating process, after reaching the set temperature, the temperature is maintained for 0.5-2 h.

In some embodiments of the present invention, during the heating process, the heating rate is controlled between 5-20° C./min.

A third aspect of the present invention is to provide the use of the iron-carbon composite material in the oxidation and/or passivation of heavy metals, especially heavy metals in water and soil.

In some embodiments of the present invention, the heavy metal includes any one or more of arsenic, cadmium, and lead, where arsenic is most preferred.

The present invention also provides a method for fixing and oxidizing As(III), which includes the following steps:

adding the iron-carbon composite material to a As(III) polluted solution or As(III) polluted soil suspension to be treated, and reacting for a period of time.

The amount of the iron-carbon composite material added in the As(III) polluted solution or As(III) polluted soil suspension to be treated is 0.2-1 g/L.

The reaction time is 4-24 h, and the temperature is 20-40° C.; the pH of the As(III) polluted solution or As(III) polluted soil suspension to be treated is 3-7, preferably 3-5, and more preferably about 3.5.

Compared with the prior art, the present invention has the following beneficial effects:

(1) The present invention wraps the nano zero-valent iron in graphite carbon and iron carbide, which can effectively prevent the nano zero-valent iron from being oxidized, and improve the material's ability to remove heavy metals, especially significantly improving the material's ability to adsorb and oxidize As(III).

(2) In the preparation method of the present invention, waste biomass can be used as a raw material, which may be activated by a specific step to adsorb iron salt, and then subjected to anaerobic high-temperature pyrolysis to prepare nano zero-valent iron wrapped by porous graphite carbon and iron carbide, realizing the efficient and long-term utilization of nano zero-valent iron. In addition, the synthesis method is simple, the obtained iron-carbon composite material is an environment-friendly material with no secondary pollution, while waste wood biomass is rich in amount and has low preparation cost.

DETAILED DESCRIPTION

The technical solution of the present invention will be further described below in conjunction with specific embodiments.

Example 1

This example provides an iron-carbon composite material which wraps nano zero-valent iron by porous graphite carbon and iron carbide, and its preparation method includes the following steps:

(1) Biomass pretreatment
- (1-1) Soak 1.2 g of ground (particle size less than 2 mm) dried wood biomass (Balsa wood) in 50 mL of 2.5 M NaOH and 0.4 M Na$_2$SO$_3$ mixed solution, stir evenly, transfer to a reactor, and keep it at 100° C. for 10 h; after the reaction, cool down to room temperature and rinse with deionized water.
- (1-2) Place the above-reacted biomass in 50 mL of 2.5 M H$_2$O$_2$ solution, transfer to the reactor, and heat to 100° C. for 6 h.
- (1-3) Take out the wood biomass after the reaction in step (1-2) and freeze-dry it to obtain activated wood biomass.

(2) Preparation of iron-carbon composite material
- (2-1) Place the activated wood biomass in 50 mL of Fe(NO$_3$)$_3$·9H$_2$O solution with a certain concentration (0.02, 0.05, 0.2 or 0.3 M), sonicate for 1 h, and then shake for 10 h to allow fully adsorption of Fe(III) by the activated wood biomass.
- (2-2) Take out the wood biomass fully adsorbed with Fe(III), freeze-dry it under vacuum, and collect the dried solid.
- (2-3) Place the wood biomass fully adsorbed with Fe(III) in a vacuum tube furnace, and heat to a certain temperature (400, 600, 800 or 1000° C.) in a nitrogen atmosphere, wherein the temperature is raised at a speed of 10° C./min; keep the temperature for 1 h, then stop heating, cool down to room temperature, and take out the material for later use.

According to different preparation conditions, a series of iron-carbon composite materials were obtained, as shown in Table 1 with serial numbers 1-7.

TABLE 1

| No. | Step (2-1) iron salt | Step (2-1) iron salt conc. (M) | step (2-3) pyrolysis temp. (° C.) | Iron-carbon composite material | Iron load |
|---|---|---|---|---|---|
| 1 | Fe(NO$_3$)$_3$·9H$_2$O | 0.2 | 400 | Fe/C400 | / |
| 2 | Fe(NO$_3$)$_3$·9H$_2$O | 0.2 | 600 | Fe/C600 | / |
| 3 | Fe(NO$_3$)$_3$·9H$_2$O | 0.2 | 800 | Fe/C800[Fe/C800(0.2)] | 24.9 wt % |
| 4 | Fe(NO$_3$)$_3$·9H$_2$O | 0.2 | 1000 | Fe/C1000 | / |
| 5 | Fe(NO$_3$)$_3$·9H$_2$O | 0.02 | 800 | Fe/C800(0.02) | 8.4 wt % |
| 6 | Fe(NO$_3$)$_3$·9H$_2$O | 0.05 | 800 | Fe/C800(0.05) | 17.8 wt % |
| 7 | Fe(NO$_3$)$_3$·9H$_2$O | 0.3 | 800 | Fe/C800(0.3) | 50.1 wt % |
| 8 | FeCl$_3$·6H$_2$O | 0.2 | 800 | Fe/C800(FeCl$_3$) | / |

Figure 1:
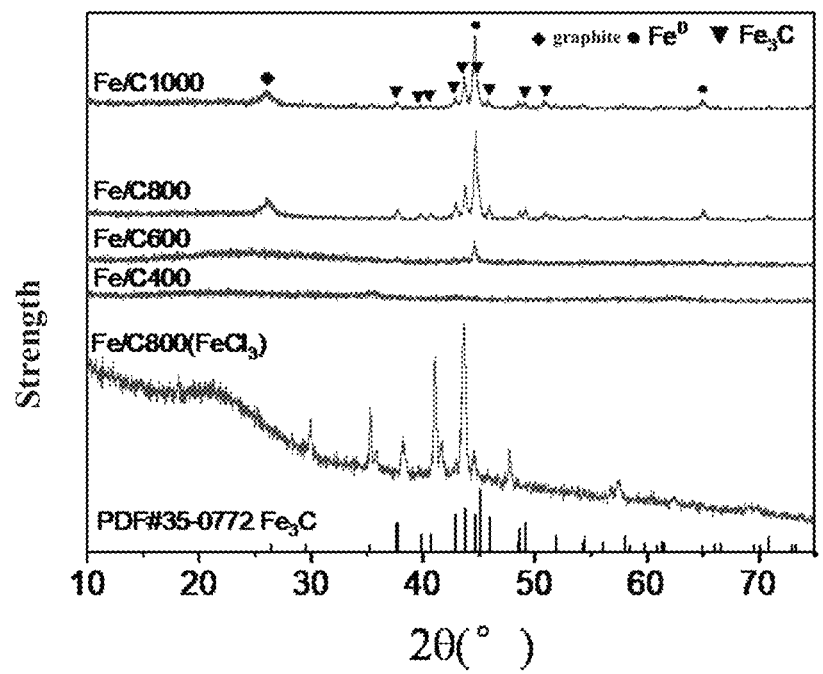
FIG. 1 shows the XRD patterns of the iron-carbon composite materials and Fe/C800(FeCl$_3$) obtained at different pyrolysis temperatures.

(1) The effect of different pyrolysis temperatures on the structure of iron-carbon composite materials and the adsorption of trivalent arsenic (1) Structural Characterization The XRDs of Fe/C400, Fe/C600, Fe/C800, Fe/C1000 prepared at different pyrolysis temperatures are shown in FIG. 1. It can be seen from FIG. 1 that when the pyrolysis temperature is 600° C., only zero-valent iron is present, and when the pyrolysis temperature is 800° C. and 1000° C., iron carbide (Fe$_3$C), graphite carbon and zero-valent iron are also present in the material.

Figure 2:
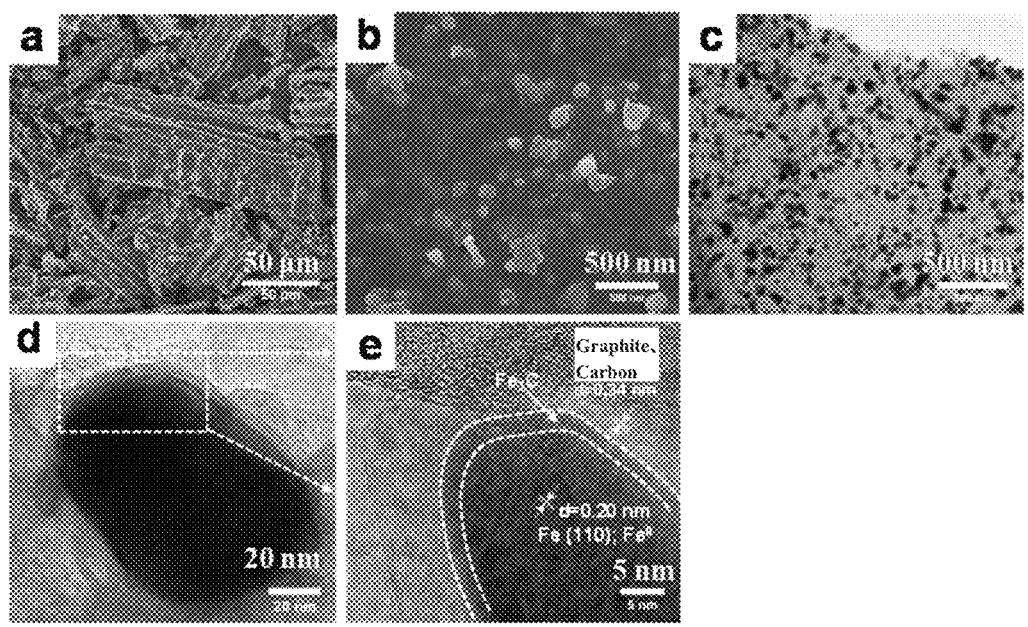
FIG. 2 shows the SEM (a, b) and TEM images (c, d, e) of Fe/C800.

The SEM and TEM images of Fe/C800 are shown in FIG. 2. According to FIG. 2, iron nanoparticles (with a particle size distribution between 30 and 80 nm) are uniformly dispersed on the surface of the carbon (with a particle size of 10-100 μm), while the three-layer core-shell structure where nano zero-valent iron is wrapped by graphite carbon and iron carbide may be seen in the high-resolution TEM image, wherein nano zero-valent iron is the innermost layer and graphite carbon is the outermost layer, which can prevent the oxidation of the nano zero-valent iron inside. Therefore, according to the analysis, when the pyrolysis temperature reaches 800° C., the iron-carbon composite material with nano zero-valent iron wrapped by porous graphite carbon and iron carbide can be prepared.

(2) Adsorption Performance of Trivalent Arsenic

Step 1): Prepare trivalent arsenic solutions with a concentration of 5 and 10 mg/L, wherein the solvent is deionized water.

Step 2): Use Fe/C400, Fe/C600, Fe/C800, Fe/C1000 for trivalent arsenic adsorption kinetics experiment, wherein the material amount is 0.5 g/L, the reaction system is 20 mL, and the initial concentration of trivalent arsenic is 5 mg/L. The initial pH of the trivalent arsenic solutions is adjusted to 3.5 with 0.1 M HCl, and the reaction is carried out in a 50 ml centrifuge tube.

Step 3): start timing after adding the material, sample at specified time, which is respectively 0, 5, 10, 30, 60, 120, 240, 360, and 480 min.

Figure 3:
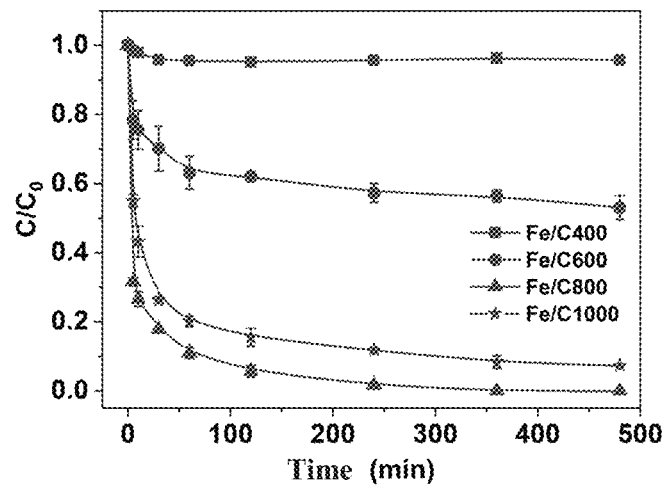
FIG. 3 shows the adsorption kinetics of As(III) on iron-carbon composite materials obtained at different pyrolysis temperatures.

Step 4): After the reaction, filter the reaction mixture through a 0.22 μm water film, measure the concentration of trivalent arsenic in the filtrate, and calculate the removal rate. The result is shown in FIG. 3. It can be seen from FIG. 3 that the removal rate of As(III) by Fe/C800 can reach 100%.

Figure 4:
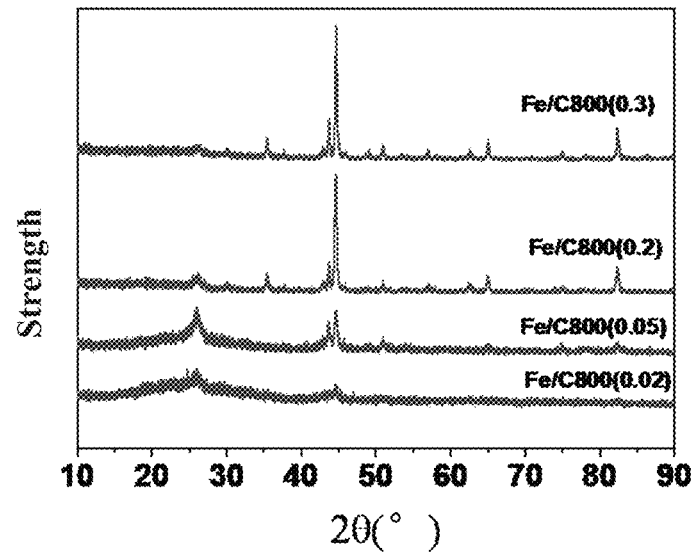
FIG. 4 shows the XRD patterns of iron-carbon composite materials with different iron loadings.

(2) The effect of different iron loadings on the structure of iron-carbon composite materials and the adsorption of trivalent arsenic (1) Structural Characterization The XRDs of Fe/C800 (0.02), Fe/C800 (0.05), Fe/C800 (0.2) and Fe/C800 (0.3) prepared with different iron salt concentrations are shown in FIG. 4. Analysis shows that porous graphite carbon, iron carbide and nano zero-valent iron will only appear when the iron salt concentration is 0.2 M and 0.3 M.

After testing, the iron loadings in Fe/C800(0.02), Fe/C800 (0.05), Fe/C800(0.2) and Fe/C800(0.3) are 8.4 wt %, 17.8 wt %, 24.9 wt %, and 50.1 wt %, respectively.

(2) Adsorption Performance of Trivalent Arsenic

Step 1): Prepare a trivalent arsenic solution with a concentration of 5 mg/L, wherein the solvent is deionized water.

Step 2): Add the prepared Fe/C800 (0.02), Fe/C800 (0.05), Fe/C800 (0.2) and Fe/C800 (0.3) with different iron loadings for trivalent arsenic adsorption kinetics experiments, wherein the material amount is 0.5 g/L, and the reaction system is 20 mL. The initial pH of the trivalent arsenic solution is adjusted to 3.5 with 0.1M HCl, and the reaction is carried out in a 50 ml centrifuge tube.

Step 3): After reacting for 480 min, filter the reaction mixture through a 0.22 μm water film, measure the concentration of trivalent arsenic in the filtrate, and calculate the removal rate.

Figure 5:
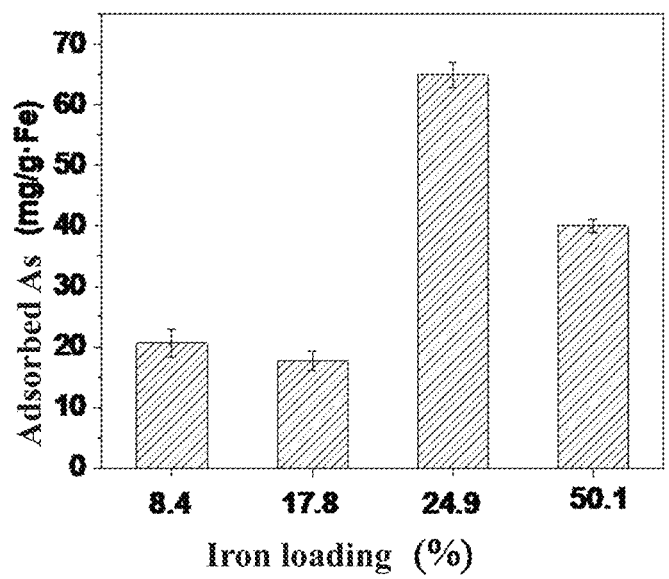
FIG. 5 is a comparison diagram of the adsorption capacity of As(III) on iron-carbon composite materials with different iron loadings.

The As(III) adsorption amount is normalized to the iron content, and the adsorption amounts of As(III) by the iron-carbon composite materials with different iron loadings are shown in FIG. 5 and Table 2.

TABLE 2

| Iron-carbon composite material | Iron loading | As(III) Adsorption amount (mg/kg•Fe) |
|---|---|---|
| Fe/C800(0.02) | 8.4 wt % | 20.66 |
| Fe/C800(0.05) | 17.8 wt % | 17.74 |
| Fe/C800[Fe/C800(0.2)] | 24.9 wt % | 64.95 |
| Fe/C800(0.3) | 50.1 wt % | 40.00 |

The results show that with the increase of iron loading, the adsorption amount of As(III) by the iron-carbon composite material changes greatly, wherein the adsorption amount of As(III) is the largest when the iron content is 24.9%.

Comparative Example 1

This comparative example provides an iron-carbon composite material [Fe/C800(FeCl$_3$)]. The preparation method differs from the Fe/C800 of Example 1 mainly in that the 0.2 M Fe(NO$_3$)$_3$·9H$_2$O solution in Example 1 is replaced with FeCl$_3$·6H$_2$O of the same concentration, while the other operations are the same as for the preparation of Fe/C800. See Table 1 for details.

The XRD of Fe/C800(FeCl$_3$) is shown in FIG. 1. FIG. 1 reflects that when FeCl$_3$·6H$_2$O is used instead of Fe (NO$_3$)$_3$·9H$_2$O, the material prepared at the same concentration and the same pyrolysis temperature does not include iron carbide and zero-valent iron, and the obtained carbon is amorphous carbon, but not graphite carbon.

Figure 6:
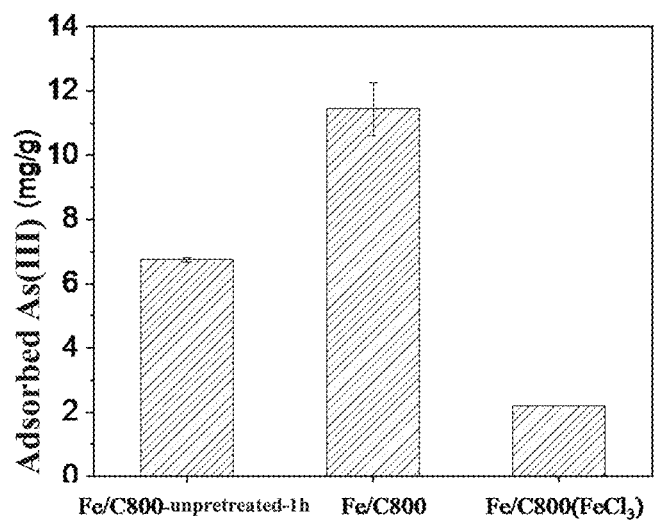
FIG. 6 shows the comparison of the adsorption capacity of As(III) on Fe/C800, Fe/C800(FeCl$_3$) and Fe/C800-unpretreated-1 h.

According to the method of Example 1, add Fe/C800 (FeCl$_3$) and Fe/C800 to 10 mg/L of As(III) solution respectively. The adsorption capacity of Fe/C800(FeCl$_3$) to As(III) is 2.2 mg/g, which is significantly lower than Fe/C800 made from Fe(NO$_3$)$_3$·9H$_2$O, as shown in FIG. 6, indicating that the type of iron salt has a great influence on the As(III) adsorption performance of iron-carbon composite material. When Fe(NO$_3$)$_3$ is used as the iron source, it can significantly increase the As(III) adsorption capacity of the iron-carbon composite material.

Comparative Example 2

This comparative example provides an iron-carbon composite material, the preparation method of which is different from the Fe/C800 of Example 1 mainly in that no biomass pretreatment is performed.

Specifically, the preparation method of the iron-carbon composite material of this comparative example includes the following steps:

(1) Add 1.2 g of ground and dried wood biomass (balsa wood) in 50 mL of 0.2 M Fe(NO$_3$)$_3$·9H$_2$O solution, sonicate for 1 h, and then shake for 10 h.

(2) Take out the wood biomass fully adsorbed with Fe(III), freeze-dry it under vacuum, and collect the dried solid.

(3) Place the wood biomass fully adsorbed with Fe(III) in a vacuum tube furnace; under a nitrogen atmosphere, increase the temperature to 800° C. at a speed of 10° C./min, and keep it for 1 hour; stop heating, cool down to room temperature, and take out the material, which is marked as Fe/C800-unpretreated-1 h.

Figure 7:
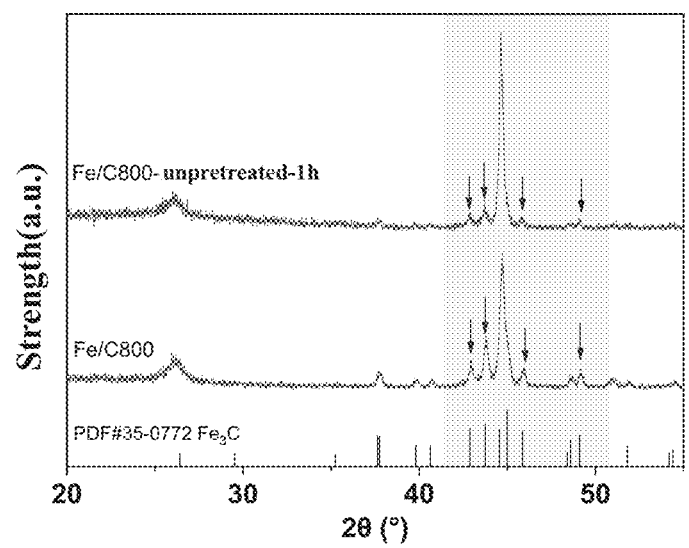
FIG. 7 shows the XRD pattern of Fe/C800 with or without biomass pretreatment.

The Fe/C800-unpretreated-1 h XRD is shown in FIG. 7 (the Fe/C800 in FIG. 7 is the one with biomass pre-treatment in Example 1). By comparing with the pre-treated Fe/C800, it can be found that the zero-valent iron diffraction peak of Fe/C800-unpretreated-1 h becomes stronger, and the corresponding iron carbide (Fe$_3$C) diffraction peak becomes weaker.

According to the method of Example 1, add Fe/C800-unpretreated-1 h and FeC800 to 10 mg/L of As(III) solution respectively, wherein the adsorption capacity of Fe/C800-unpretreated-1 h to As(III) is 6.74 mg/g, which is significantly lower than the Fe/C800 prepared with pretreatment. As shown in FIG. 6, the pretreatment of biomass can effectively improve the As(III) adsorption capacity of iron-carbon composite material.

Comparative Example 3

This comparative example provides a biochar (C), a biochar loaded with nano zero-valent iron composite material (BC/nZVI), and an activated carbon loaded with nano zero-valent iron (AC/nZVI).

Among them, the biochar (C) is made by pyrolyzing the same wood biomass as in Example 1 at 800° C. under N$_2$ atmosphere in a vacuum tube furnace; BC/nZVI is made by synthesizing zero-valent iron through NaBH$_4$ and loading it on the surface of the biochar. The specific preparation method is as follows.

(1) Preparation of Biochar (C)

Add 1.2 g of ground and dried wood biomass (Balsa wood) into a vacuum tube furnace, introduce N$_2$, and pyrolyze at 800° C. for 1 h with a temperature rising rate of 10° C./min.

(2) Preparation of Biochar Loaded with Nano Zero-Valent Iron Composite Material (BC/nZVI)

Add 0.45 g of the biochar prepared in (1) and FeSO$_4$.7H$_2$O (0.75 g) into 100 mL of anaerobic water, sonicate and stir for 30 min, then add a solution prepared by adding 0.2 g of NaBH$_4$ to 20 mL of deionized water, so as to reduce Fe(II) to Fe$^0$. The whole process is carried out in a nitrogen atmosphere. After continuous stirring for 30 minutes, wash the product with absolute ethanol for 3 times and dry for later use.

The iron content in the prepared BC/nZVI is about 25%, which is consistent with FeC/800.

(3) Preparation of Activated Carbon Loaded with Nano Zero-Valent Iron (AC/nZVI)

The preparation method of AC/nZVI is similar to that of BC/nZVI. The difference is that the biochar is replaced with activated carbon of equal quality. The activated carbon is commercial activated carbon (AC, purchased from Guangzhou Chemical Reagent Factory).

The biochar, BC/nZVI and AC/nZVI prepared in this comparative example are applied in As(III) removal. As a comparison, Fe/C800 of Example 1 and commercial nano zero-valent iron (nZVI, particle size is 50 nm) are used to carry out the same experiment as follows:

(1) The Stability and Long-Term Effect of Different Materials on the Removal of As(III)

Step 1): Prepare a trivalent arsenic solution with a concentration of 5 mg/L, wherein the solvent is deionized water.

Step 2): In order to verify the stability and long-term effect of the material, add Fe/C800, BC/nZVI and nZVI respectively in 30 mL of deionized water and stir for 24 h.

Step 3): After stirring, take out the material and add it in the trivalent arsenic solution, use 0.1M HCl to adjust the initial pH of the trivalent arsenic solution to 3.5, wherein the material amount is 0.5 g/L, the reaction system is 20 mL; and react in a 50 ml centrifuge tube.

Step 4): After reacting for 0, 5, 10, 30, 60, 120, 240, and 360 min, filter the reaction mixture through a 0.22 μm water film, measure the concentration of trivalent arsenic in the filtrate, and calculate the removal rate. The result is as shown in FIG. 8.

Figure 8:
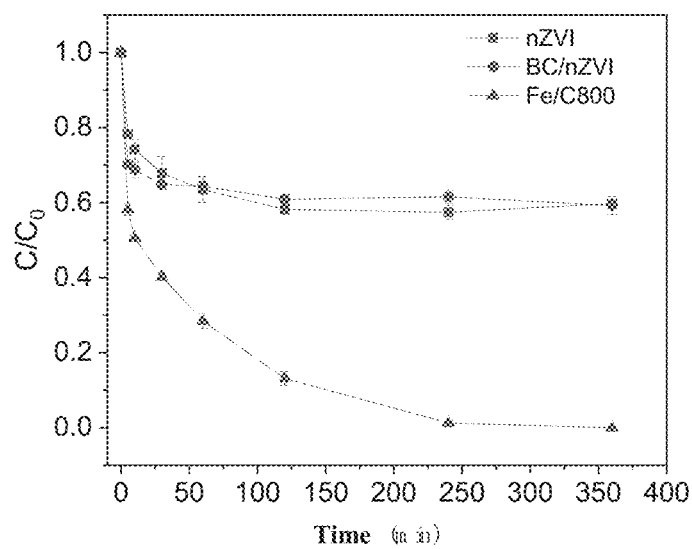
FIG. 8 is a comparison diagram of the stability and long-term effect of Fe/C800, BC/nZVI and nZVI on As(III) removal.

It can be seen from FIG. 8 that after water treatment, the removal rate of As(III) by BC/nZVI and nZVI is significantly lower than that of Fe/C800 (100%), indicating that compared with BC/nZVI and nZVI, Fe/C800 has higher stability in water and can maintain the ability to remove As(III) for a long time due to its structure of porous graphite carbon and iron carbide wrapped nano zero-valent iron.

(2) The Oxidation Ability of Different Materials to As(III)

Step 1): Prepare a trivalent arsenic solution with a concentration of 5 mg/L, wherein the solvent is deionized water.

Step 2): Take Fe/C600, Fe/C800, BC/nZVI and AC/nZVI for trivalent arsenic adsorption kinetics experiment, where the composite material amount is 0.5 g/L, and the reaction system is 20 mL. The initial pH of the trivalent arsenic solution is adjusted to 3.5 with 0.1M HCl, and the reaction is carried out in a 50 ml centrifuge tube.

Figure 9:
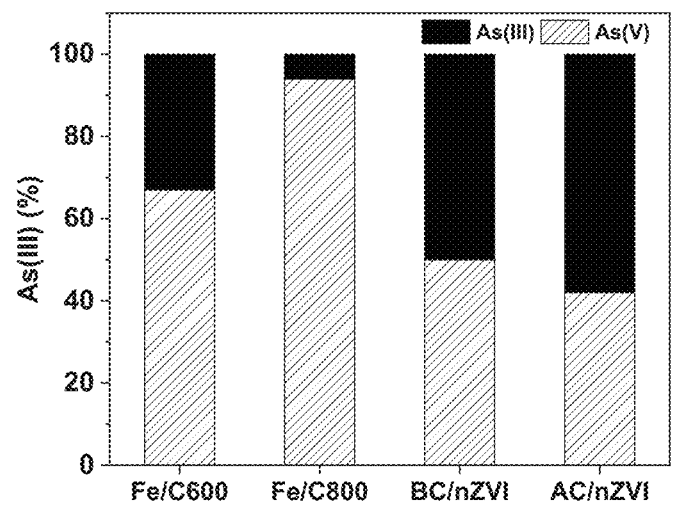
FIG. 9 is a comparison diagram of the oxidation efficiency of Fe/C600, Fe/C800, BC/nZVI and AC/nZVI on As(III)

Step 3): After 480 min of reaction, remove the supernatant by centrifugation, take out and freeze dry the reacted material. Then the frozen material is used for XPS determination to analyze the relative content of As(III) and As(V) on the surface of the material. The result is shown in FIG. 9.

The results show that the oxidation ability of Fe/C800 to As(III) is much higher than that of Fe/C600 (67%), BC/nZVI (50%) and AC/nZVI (42%), indicating that it has the strongest oxidation ability. Fe/C800 has a surface As (V) content of up to 94%.

(3) Fixation of Arsenic in Soil with Different Materials

Step 1): Dry the arsenic polluted paddy soil, and grind it through a 2 mm sieve. Use deionized water to prepare a 0.5 M NaHCO$_3$ solution.

Step 2): Take Fe/C800, biochar, BC/nZVI and nZVI for soil arsenic fixation experiments, wherein the water-soil ratio is 10:1, the reaction system is 20 mL, and the material amount is 1 g/L. Culture them in 50 mL vials, firstly under anaerobic condition for 7 days, and then under aerobic condition for 20 days to simulate anaerobic and aerobic conditions of paddy soil.

Step 3): After culturing, centrifuge to remove the supernatant, then add 1 g of the soil in a 50 mL centrifuge tube, and add 30 mL of 0.5 M NaHCO$_3$ solution, followed by shaking for 16 h at 25° C.

Figure 10:
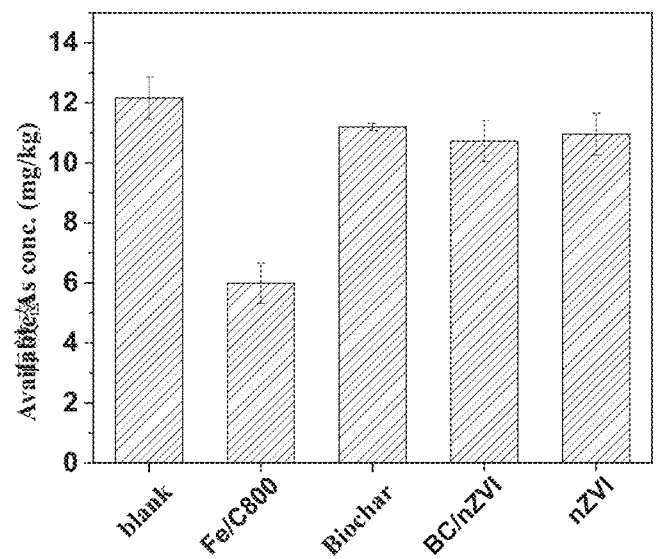
FIG. 10 is a comparison diagram of the fixation efficiency of Fe/C800, biochar, BC/nZVI and nZVI on arsenic in soil.

Step 4): Centrifuge after shaking, filter the supernatant through a 0.22 μm water film, measure the concentration of arsenic in the filtrate, and calculate the concentration of available arsenic in the soil after different treatments. The results are shown in FIG. 10.

The contents of available arsenic in the soil treated with different materials are: Fe/C800 (5.98 mg/kg)<BC/nZVI (10.72 mg/kg)<nZVI (10.96 mg/kg)<Biochar (11.19 mg/kg) <blank control (12.16 mg/kg). The results show that Fe/C800 has the strongest ability to fix arsenic in soil and has outstanding advantages.

The above-mentioned embodiments are preferred embodiments of the present invention, but the embodiments of the present invention are not limited by the above-mentioned embodiments, and any other changes, modifications, substitutions, combinations, and simplifications made without departing from the spirit and principle of the present invention all should be equivalent replacement methods, and they are all included in the protection scope of the present invention.

The invention claimed is:

1. A method for preparing an iron-carbon composite material, wherein the iron-carbon composite material has a three-layer core-shell structure, comprising a porous graphite carbon outer layer, an iron carbide intermediate layer, and a nano zero-valent iron core in sequence from outside to inside, the method comprising the following steps:

(1) soaking a biomass in a mixed solution of base and sulfite to carry out a first hydrothermal reaction; mixing the product obtained in the first hydrothermal reaction with an H$_2$O$_2$ solution, and carrying out a second hydrothermal reaction to obtain an activated biomass;

(2) immersing the activated biomass in an iron salt solution to obtain a biomass adsorbed with iron ions; and (3) reducing the biomass adsorbed with iron ions to obtain the iron-carbon composite material.

2. The method according to claim 1, wherein in the mixed solution of base and sulfite of step (1), the concentration of the base is 1-3 M.

3. The method according to claim 1, wherein in step (2), the concentration of the iron salt solution is 0.02-0.5 M.

4. The method according to claim 1, wherein in step (3), the reduction is pyrolysis reduction.

5. The method of claim 4, wherein the pyrolysis reduction comprises: under a protective atmosphere, heating the biomass adsorbed with iron ions.

6. The method of claim 5, wherein the temperature of the heating is ≥800° C.

7. The method of claim 5, wherein the temperature of the heating is 800-1000° C.

8. The method of claim 1, wherein in the mixed solution of base and sulfite of step (1), the concentration of the sulfite is 0.05-1 M.

9. The method of claim 1, wherein in step (2), the concentration of the iron salt solution is 0.1-0.5 M.

10. An iron-carbon composite material prepared according to the method of claim 1.

11. The iron-carbon composite material according to claim 10, wherein the porous graphite carbon has a particle size of 10-100 μm.

12. The iron-carbon composite material according to claim 10, wherein the particle size of the nano zero-valent iron is 30-80 nm.

13. The iron-carbon composite material according to claim 10, wherein the total content of the iron carbide and nano zero-valent iron in the iron-carbon composite material is 5%-55%.

14. The iron-carbon composite material according to claim 10, wherein the total content of the iron carbide and nano zero-valent iron in the iron-carbon composite material is 20%-51%.

15. The iron-carbon composite material according to claim 10, wherein the total content of the iron carbide and nano zero-valent iron in the iron-carbon composite material is 24%-25%.

16. A method of oxidation and/or passivation of a heavy metal comprising mixing the iron-carbon composite material according to claim 10 with water comprising a heavy metal and/or soil comprising a heavy metal.

17. The method according to claim 16, further comprising the following steps:
    adding the iron-carbon composite material to a As(III) polluted solution or As(III) polluted soil suspension to be treated, and reacting for a period of time.

18. The method of claim 16, wherein the heavy metal is in soil and water.

19. The method of claim 16, wherein the heavy metal comprises one or more of arsenic, cadmium, and/or lead.

20. The method of claim 16, wherein the heavy metal is arsenic.

* * * * *

UNITED STATES PATENT AND TRADEMARK OFFICE
CERTIFICATE OF CORRECTION

PATENT NO. : 11,697,595 B2
APPLICATION NO. : 17/336870
DATED : July 11, 2023
INVENTOR(S) : Fangbai Li et al.

It is certified that error appears in the above-identified patent and that said Letters Patent is hereby corrected as shown below:

On the Title Page

Column 1, Assignee, Line 3, after "Sciences" insert -- (CN) --

Signed and Sealed this
Twelfth Day of September, 2023

Katherine Kelly Vidal
Director of the United States Patent and Trademark Office